United States Patent
Parmar et al.

(10) Patent No.: US 8,200,206 B2
(45) Date of Patent: Jun. 12, 2012

(54) VIRTUAL MOBILE AND AD/ALERT MANAGEMENT FOR MOBILE DEVICES

(75) Inventors: Ramesh Parmar, Scotch Plains, NJ (US); Dinesh Doshi, South Plainfield, NJ (US); Deepa Jagannatha, Somerset, NJ (US)

(73) Assignee: w2bi, Inc., Union, NJ (US)

( * ) Notice: Subject to any disclaimer, the term of this patent is extended or adjusted under 35 U.S.C. 154(b) by 463 days.

(21) Appl. No.: 12/426,555

(22) Filed: Apr. 20, 2009

(65) Prior Publication Data
US 2009/0264102 A1 Oct. 22, 2009

Related U.S. Application Data

(60) Provisional application No. 61/046,593, filed on Apr. 21, 2008.

(51) Int. Cl.
*H04M 3/00* (2006.01)
*H04M 3/42* (2006.01)
*H04M 3/16* (2006.01)
*G06F 15/16* (2006.01)

(52) U.S. Cl. ............... 455/420; 455/414.2; 455/411; 709/217

(58) Field of Classification Search ............... 455/414.2, 455/411, 420; 709/217
See application file for complete search history.

(56) References Cited

U.S. PATENT DOCUMENTS

2005/0192052 A1* 9/2005 Tenhunen ............... 455/557
2008/0160956 A1* 7/2008 Jackson et al. ............ 455/406

* cited by examiner

*Primary Examiner* — Ariel Balaoing
(74) *Attorney, Agent, or Firm* — McHale & Slavin, P.A.

(57) ABSTRACT

Disclosed is a process to control any mobile device through a protocol stack for sending Ad Alerts and performing Virtual Mobile Management. The client application captures a snapshot that is encrypted and compressed into an XML format using delta compression algorithms. On the server, the xml file is then parsed, decrypted and decompressed and the corresponding values are stored in the database. Ad management/alert notification allows a user to create new Advertisements /Banners/Alerts. Advertisements may add an image to the background of the Ad; Changing the Text on the Ad; Create Special effects for the Text on the Ad; Customizing Font color and size. Advertisement may be sent instantaneously or at a later time for Alerts, Ads or banners without the need for browsing through the internet.

16 Claims, 8 Drawing Sheets

VIRTUAL MOBILE AND AD/ALERT MANAGEMENT FOR MOBILE DEVICES

CROSS-REFERENCE TO RELATED APPLICATIONS

This application claims the benefit under 35 U.S.C. 119(e) of U.S. Provisional Patent Application No. 61/046,593, filed Apr. 21, 2008, entitled VIRTUAL MOBILE AND AD/ALERT MANAGEMENT FOR MOBILE DEVICES, the entirety of which is incorporated herein by reference.

FIELD OF INVENTION

The present invention relates to mobile wireless communication devices, systems, networks and methods of operation. In particular the present invention is directed to mobile wireless communication devices capable of "Virtual Mobile Management", "Advertisement Push" and "Alert Notification."

BACKGROUND OF THE INVENTION

Unhindered remote connectivity to a mobile device is achieved via this invention. The ability to connect to a mobile device and control its functionality has infinite advantages. Also for the admin group in an enterprise, the ability to have full control on the fleet of terminals deployed is very critical for support purposes. There is a strong need for the IT professionals to centrally manage mobile devices similar to PCs.

There is a need for a flexible, end-to-end solution to ease the process of securing and managing devices within a corporate network, while providing a more secure, single-point access for applications and corporate data.

Security policies for devices are increasingly deployed throughout enterprise networks, rather than just at the perimeter. It's more than a full-time job for the security team of any enterprise to map organizational security policies to the detailed configuration of those devices; in addition to ensuring that the configurations remain constant, while needs evolve.

Advertising is an important and emerging component to mobile data services. With advertising, the cost of mobile data services can be distributed or shifted from the consumer to other participants in the value-chain—subsequently making it cheaper for subscribers to use data services.

Mobile Advertising is a form of advertising via mobile (wireless) phones or other mobile devices. It is a subset of mobile marketing. Some see mobile advertising as closely related to online or internet advertising, though its reach is far greater—currently, most mobile advertising is targeted at mobile phones that estimated to number at a global total of 3 billion as of 2007, reached approximately 4 billion in 2008 and will continue to grow in the future. Notably computers, including desktops and laptops, are currently estimated at 800 million globally.

In some markets, this type of advertising is most commonly seen as a Mobile Web Banner (top of page) or Mobile Web Poster (bottom of page banner), while in others, it is dominated by early forms, such as SMS advertising (which has been estimated at over 90% of mobile marketing revenue worldwide). Other forms include MMS advertising, advertising within mobile games and mobile videos, during mobile TV receipt, full-screen interstices, which appear while a requested item of mobile content or mobile web page is loading up, and audio adverts (e.g., in the form of a jingle before a voicemail recording).

Another interesting part of Advertising is "Alert Notifications" for the mobile. Alert Notification on mobile devices can be sent periodically based on the criticality of the alert level. For example a customer needs to be notified for some important event like "Registering for Training schedule" or "Bank transaction alerts" etc. Specific events can generate alerts immediately at the time the event occurs rather than periodically. This capability can be used to send notifications at the time a transaction is entered. This facility can also be used by custom applications to provide notifications.

SUMMARY OF THE INVENTION

Disclosed are a Virtual Mobile Management Process and Advertisement Push/Alert Notification for any Mobile device by sending the required commands over a peer-to-peer TCP/HTTP/HTTPS Connection.

In operation the system follows a proprietary protocol implementation in establishing a peer-to-peer connection between the server components and the client devices with every protocol layer maintaining its own state.

The Protocol Layers consist of the following:
Application Sub-Layer Hub (ASL Hub)
Session Layer
Link Layer In operation for any tool request like Virtual Mobile Management or pushing Alerts to the devices, the request to the Server comes from the Console and then passes through every protocol layer to maintain an appropriate state for every connection made. Once the Server receives the request it authorizes and makes a connection request with the Client. If the client acknowledges the connection request it establishes a connection with the server and a peer-to-peer connection is established.

The client application captures the snapshot of the device, compresses and encrypts the data and posts on the server in an XML format. On the server, the xml file is then parsed, decrypted and decompressed and the corresponding values are stored in the database. The Server console application loads the most recent image from the database for every refresh for the complete session. The virtual view of the device starts only after the client explicitly authorizes the request from the server. When the user clicks on the Virtual View of the device on the Server webpage (Image posted by the device and retrieved via database) the image get displayed on the webpage. The tap can be also simulated on the device. The 'X' and 'Y' co-ordinates are captured on the server virtual view and are then saved into the database.

Once the user posts the next frame of image data it downloads the above XML values and flags it as read, to avoid duplicates. Downloaded XML is then parsed at mobile client, and "Post Message" API function is called to trigger the Stylus tap event. The key press events can be simulated in the similar manner. In this case, Key press API is called to trigger the key press event.

Management/alert notification allows a user to create new Advertisements/Banners/Alerts. Advertisements are managed by adding an image to the background of the Ad; Changing the Text on the Ad; Creating Special effects for the Text on the Ad; Customizing Font color and size. After the Advertisements/Alerts/Banners are created on the server, the same can be pushed on to the mobile device. A command is sent to invoke the client Ad Listener application residing on the client. The client application uses the above message in the command as argument & includes the fully qualified server address & downloads the XML, parses it, applies the settings & displays the Advertisement. The Advertisement can be sent to the mobile devices instantaneously or scheduled for delivery at a later time.

The user can get Alerts, Ads or banners on the mobile device without the need for browsing through the internet or explicitly requesting for the same. The server can schedule Ad/Alert/banner to group or individual user at a particular time, based on the type of content to be sent. Every Ad/Alert/Banner can be customized according to the device type, as each device may potentially have different screen sizes. All Alerts/Ads/Banners have provisions to disappear automatically after displaying for few seconds or the user can close them explicitly. All the configuration options will be available on the server side. The type for the Ad/Banner/Alert can be Plain Text; Hyperlink; Reminder; Confirmation (for e.g., capturing survey information) or invoking any local application on the device.

The objective of the invention is to disclose a virtual mobile management system that provides a flexible, end-to-end solution to ease the process of securing and managing devices within a corporate network, while providing a more secure, single-point access for applications and corporate data. It also provides a real-time view of the Mobile screen, provides a flexible approach to remotely view and manage the user's mobile desktop for troubleshooting purposes, remote installation, remote command launch etc.

Another objective of the invention is to disclose a novel method of mobile advertising through mobile data services.

Still another objective of the invention is to disclose a novel method of providing "Alert Notifications" for a mobile.

Other objectives and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

DETAILED DESCRIPTION OF THE INVENTION

Present invention is a simple and comprehensive Device Management solution to virtually control, manage and push Advertisement/Alert notifications to Mobile Devices.

Architecture

The present invention is based on a client-server architecture which communicates over a wireless network. A client-server application is a distributed system that constitutes of both client and server software. A client software or process may initiate a communication session, while the server waits for requests from the client.

CONNECTION PROCTOR SERVER: Connection Proctor server provides the endpoint for the device network connection that includes the following:

This server provides the ingress for managed device sessions, and forwards network and device management communications between the company network and the device.

Authenticates incoming connections for authorized devices.

Enables fast resume and reconnect features for devices and applications.

You can also load balance traffic across multiple computers that are running Connection Proctor.

ADMIN SERVER: Admin Server is the primary administration and management service for all managed devices and servers. This server communicates with existing servers and manages the translation of information and commands between the system and managed devices.

Admin Server has three logical components:

Admin Service (Web Service)

Controls the Administration of servers and devices.

Anchor Service (Web Service)

Handles all the device connections for different tools like VMM, AD/Alert Push.

Supports callback functionalities for devices to post its IP Address for Device Registration.

Single point of connection for the console to send all the requests.

Admin Server (Windows Daemon Service): Admin Server consists of three components.

Sync Server: Synchronizes the Active Directory and the Database

Job Scheduler: Performs job scheduling

Connector: Assists in distributing the load between Connection Proctors

MANAGEMENT CONSOLE: Management Console provides a graphical user interface for controlling managed devices, and Servers. AMC enables you to perform the following administrative tasks:

Remotely view and control Managed Devices.

Push instant messages such as Reminders, Notifications, Confirmation alerts to one or more Managed devices.

View list of Managed Devices.

View Reports for device history, virtual mobile management sessions, Alert Notifications, that was pushed to one or more device.

View Activity Logs for every connection made from the console.

DATABASE: The services on Connection Proctor Server and Admin Server maintain databases to manage device & server configuration, tasks, and status settings. These SQL databases are pivotal to configure and update managed devices and servers.

Figure 1:
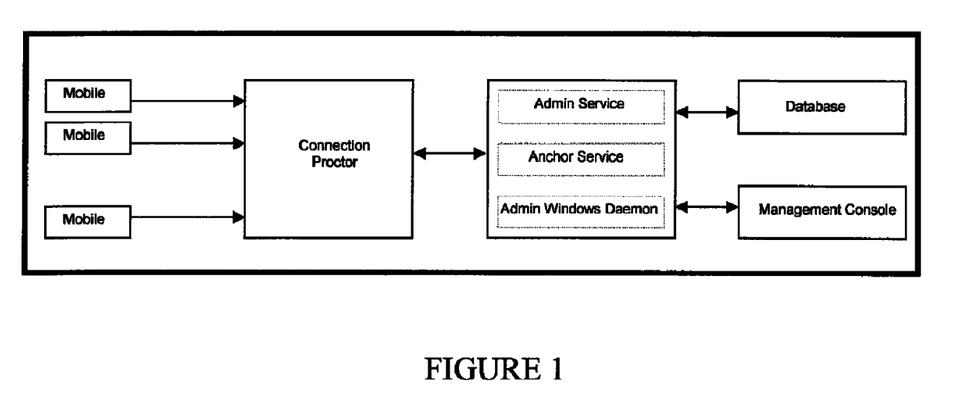
FIG. 1 is the client server architecture for virtual mobile management and ad management/alert notification.
Figure 2:
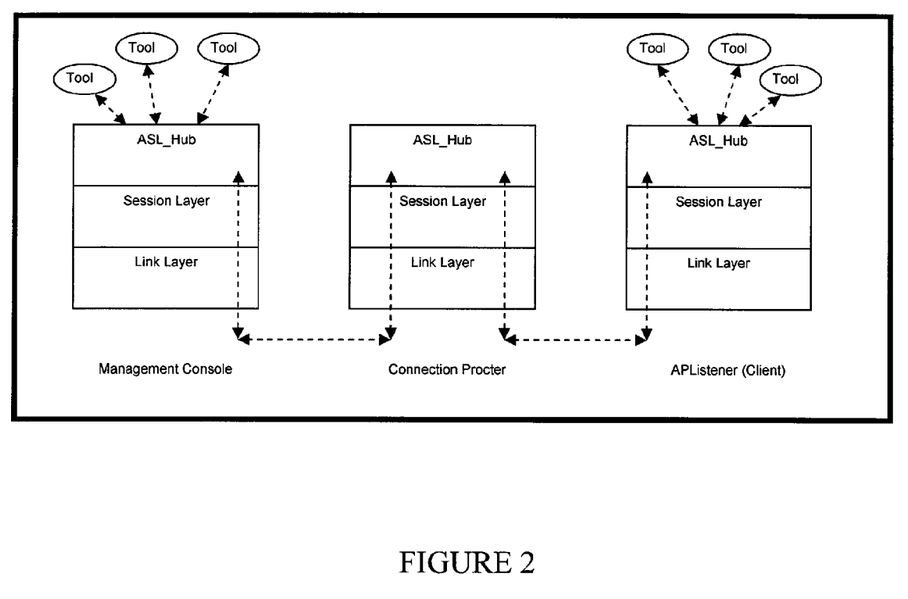
FIG. 2 is the Protocol stack and its interaction between Management Console and Device.
Figure 3:
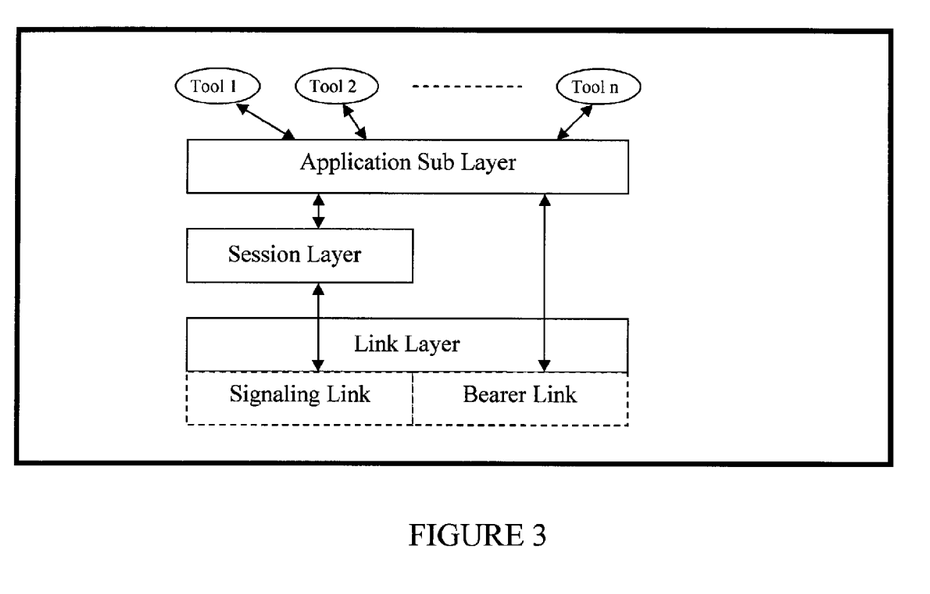
FIG. 3 is the Message flow diagram between various protocol layers.

PROTOCOL STACK: Protocol stack has three layers. FIG. 2 shows how each layer interacts with Management console and AP listener on the device.

Application Sub Layer Hub

Session Layer

Link Layer

ASL Hub: ASL Hub Layer is the topmost layer of the protocol stack which acts as a hub in establishing connection with the Tools (Applications like Virtual Mobile Management, Alert Management) and the Session Layer. For every Application request an appropriate instance of the session is invoked.

Session Layer: Session Layer establishes session for every connection request that comes.

Link Layer: Link Layer establishes two types of links for the peers to communicate with each other and send information.

Bearer Link: This link will be used to send only bearer messages between two communicating peers (processes).

Signaling Link: This link will be used to send only signaling messages between two communicating peers (processes). Signaling link may be used to carry Bearer Link data (BOS: Bearer over Signaling) if necessary (For example: Alert management, URL can be sent to the device on signaling link). This will avoid any additional resource usage by sending the data on a bearer link.

Peer-to-Peer Communication Process

Peer-to-Peer Communication takes place by the exchange of the right Request Response messages exchanged on the signaling link.

Figure 4:
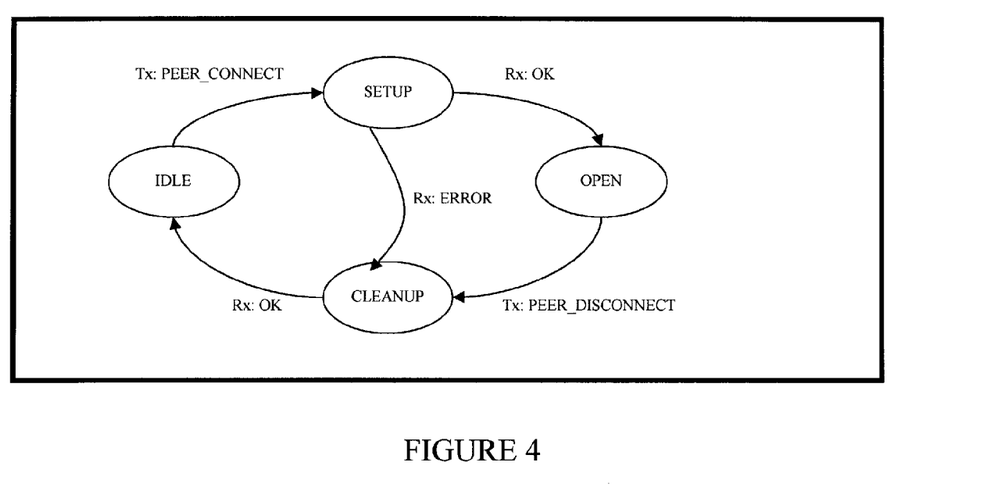
FIG. 4 is the state transition diagram.

Commands and messages are passed between layers as shown in FIG. 4 in the following ways.

Method: Each layer will provide methods which are availed by the upper layer.

Event: Lower layers will notify registered upper layers using events.

Callback: Upper layers can register with the lower layers to receive messages through callback.

PEER-TO-PEER CONNECTION: Every Layer manages its own Protocol Stack and Event States. When a connection request is made all the layers in the protocol stack in each peer will have to transition into different states at different events. FIG. 4 shows the state transition diagram. The below section will describe how this connection is established.

Step 1: When a Connection request is made for any tool like VMM or AD/Alert push, the Management Console sends a PEER_CONNECT request to the Connection Proctor Server.

Step 2: The Connection Proctor server authorizes the Connection Request and sends the PEER_CONNECT request to the relevant device.

Step 3: When the client (APLISTENER) receives the PEER_CONNECT request message it has to send an ACK or NAK based on its current state.

Step 4: Once the Server receives an ACK it will make the appropriate TOOL_SERVICE request (VMM or AD/Alert push) with the Client.

Step 5: Based on the response (ACK or NAK) the Connection proctor will establish a peer-to-peer connection or disconnect the session.

Figure 5:
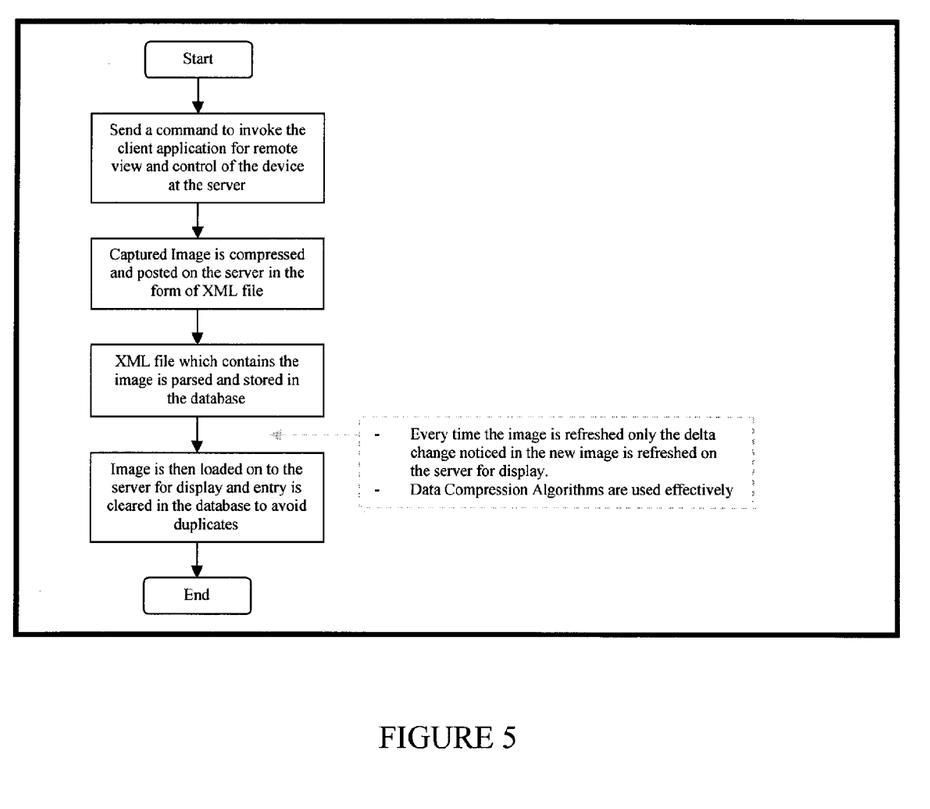
FIG. 5 is process flow for the virtual mobile management system of the instant invention.

For every session established the following precheck will be done by the Admin Server:

Every session shall have a unique Session Handle ID
Every Session Handle shall have session states:
InProcurement: When a Connection Request is successful
InSession: When a peer-to-peer connection is established
Every peer will be maintaining its own state:
Open
Setup
Cleanup
Idle
Virtual Mobile Management Virtual Mobile Management allows the Administrator to view and control the Managed device remotely through a wireless network. Some the high-lights are:

Remote Display
Image Resize
Image Refresh
Delta Update for bandwidth optimization
Remote Key Press
Remote Key Taps
Device Statistics during Virtual mobile management session
Seamless Virtual mobile management session with multiple devices
User Control to pause and resume remote control session on the device
Take snapshots
Secured Session
Process Flow for Virtual Mobile Management Process for Client and Server Communication (Refer FIG. 5)

Client application for VMM is invoked on the device to have a full administrative control access on the mobile device.

The client application captures the snapshot of the device, compresses and encrypts the data and posts on the server. Before posting the compressed data, the client converts it into Base64 string format and posts the image in the following xml format:

```
<frame>
    <uid>IMEI number</uid>
    <data>Data Screenshot of the current frame</data>
    <fcount>framecount</fcount>
    <height>height of the mobile screen</height>
    <width>width of the mobile screen</width>
</frame>
```

The xml file is then parsed, decrypted and decompressed. And then the corresponding values are stored in the database.

The Server application loads the most recent image from the database for every refresh for the complete session.

When the session is ended on server, the client is informed to stop posting new image data for VMM process and the client exits from the session.

Alternatively the session could be terminated by the client.

Process Flow for Mouse Click on the Virtual Mobile View on the Server (Refer FIG. 5)

The virtual view of the device starts only after the client explicitly authorizes the request from the server. However this can be optional.

When the user clicks on the Virtual View of the device on the Server webpage (Image posted by the device and retrieved via database) the image get displayed on the webpage. This refreshes at a frequent interval.

The tap can be also simulated on the device. For this, the 'X' and 'Y' co-ordinates are captured on the server virtual view.

Co-ordinates are then saved into the database in the following format.

```
<res>
    <click>
        <x> X coordinate </x>
        <y> Y coordinate </y>
    </click>
</res>
```

Once the client posts the next frame of image data it downloads the above XML values and flags it as read, to avoid duplicates.

Downloaded XML is then parsed at client, and "PostMessage" API function is called to trigger the Stylus tap event.

The key press events can be simulated in the similar manner. Following XML format is used to trigger the key press event. In this case, Key press API is called to trigger the key press event.

```
<res>
    <text>Key values</text>
</res>
```

Figure 6:
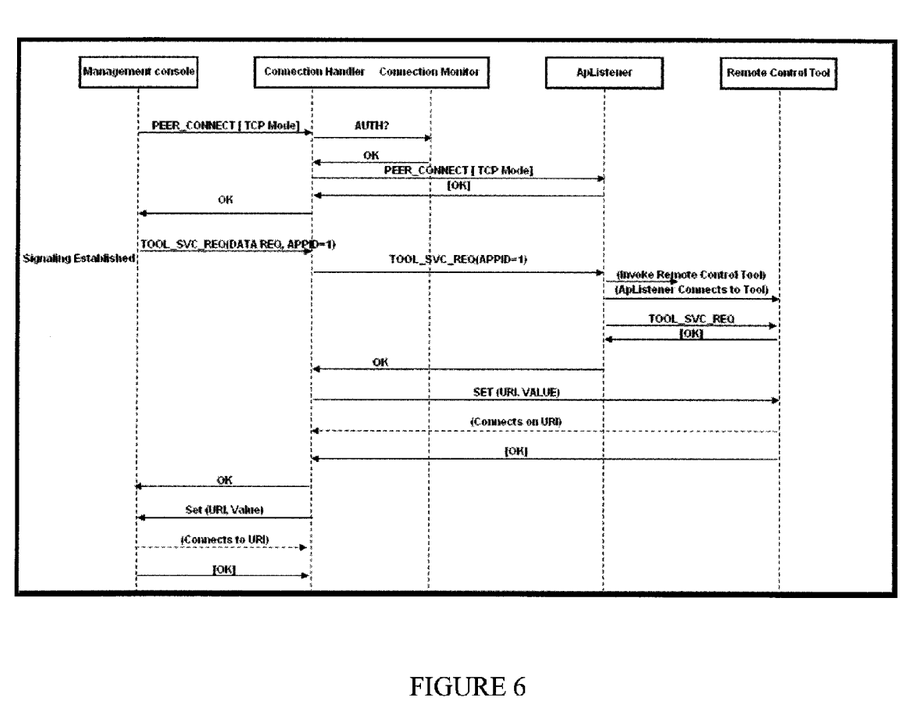
FIG. 6 is the call flow for successful virtual mobile management session.

FIG. 6 shows the successful session for a Virtual Mobile Management session.

VIRTUAL MOBILE CONCEPTS: The virtual image update on the server can be accomplished in three different ways:

Client Initiated: In this mode the client sends the Mobile device screen snapshots directly to the server periodically. The client will use the Encryption and Delta Compression algorithm to send the images.

Server Initiated: In this mode the server requests the client to send the snapshots as and when required. Even in this mode, encryption and delta computation algorithm is followed.

Database Store: In this mode the client periodically stores the snapshots in the database and the server periodically retrieves the snapshots from the database when required.

DELTA COMPUTATION FOR VMM: It is sometimes beneficial to transmit only the differences between two versions of a file (in video compression of an image), additionally applying compression on the differential component increases the efficiency. This is called delta compression (from the Greek letter Δ which is commonly used in mathematics to denote a difference), but the term is typically used only if both versions are meaningful outside compression and decompression.

DATA COMPRESSION ALGORITHM: Lossless data compression is a class of data compression algorithms that allows the exact original data to be reconstructed from the compressed data. This can be contrasted to lossy data compression, which does not allow the exact original data to be reconstructed from the compressed data.

ENCRYPTION: Every snapshot and message sent between the client and server will be encrypted using different encryption algorithms.

IMAGE RESOLUTION: Different kinds of image resolutions will be used effectively to reduce the bandwidth requirement for sending the images to the server.

Grayscale
High—24 bit bitmap
Low—16 color bitmap
Medium—256 color bitmap
JPEG
GIF BENEFITS OF VIRTUAL MOBILE MANAGEMENT: VMM is not limited for virtual view of mobile screen but to have a full administrative control on the device for any of the following purpose:

Virtual/Remote Installation: The Administrator can install applications on the multiple device seamlessly and simultaneously view the installation process Virtual/Remote Command Launcher: Administrator can remotely launch commands on the device and see the actions. For example: Executing Word, PPT, Scan application on the device Managing from another mobile: Allows the Administrator to view and control the user device from the administrator's mobile while on the road.

Multiple virtual mobile desktop viewing: Can simultaneously view multiple mobile devices on the server and control the same.

IM Integration: The user can send a message asking the administrator to troubleshoot the device by transferring the control to the administrator over any Instant Messaging available on the device Multiple OS support: VMM can be used to manage any device type with OS such as Windows Mobile, Blackberry, Virtual Key press and taps: VMM can be used to simulate virtual Key presses and taps.

Ad Management/Alert Notification

Mobile Phone marketing has rapidly emerged as a powerful component of any interactive marketing mix. While not a standalone marketing channel, mobile phone marketing provides an opportunity for interaction with users who may otherwise not be willing to interact.

Alert Notification/Ad management feature is used to deliver custom messages to one or more devices. Some of the highlights are:

Simple Alerts
Simple message notifications
Confirmation Alerts
Messages which requires the user to send a response back
Reminder Alerts
Messages that will remind the user of a particular event
Option to schedule alerts
Simple and intuitive interface to compose and send notifications
Option to store the messages in a local folder on the device FUNCTIONALITY: Ad Management/Alert Notification offer the following feature functionalities:

Create new Advertisements/Banners/Alerts.
Manage Advertisements.
Adding image to the background of the Ad
Changing the Text on the Ad
Create Special effects for the Text on the Ad
Customizing Font color and size After the Advertisements/Alerts/Banners are created on the server, the same can be pushed on to the mobile device.

A command is sent to invoke the client Ad Listener application residing on the client to receive these messages.

Ad/Alert/Banner can be sent to any type of mobile devices.

Can be used to send Reminder Alerts to the user to remind of an event.

Figure 7:
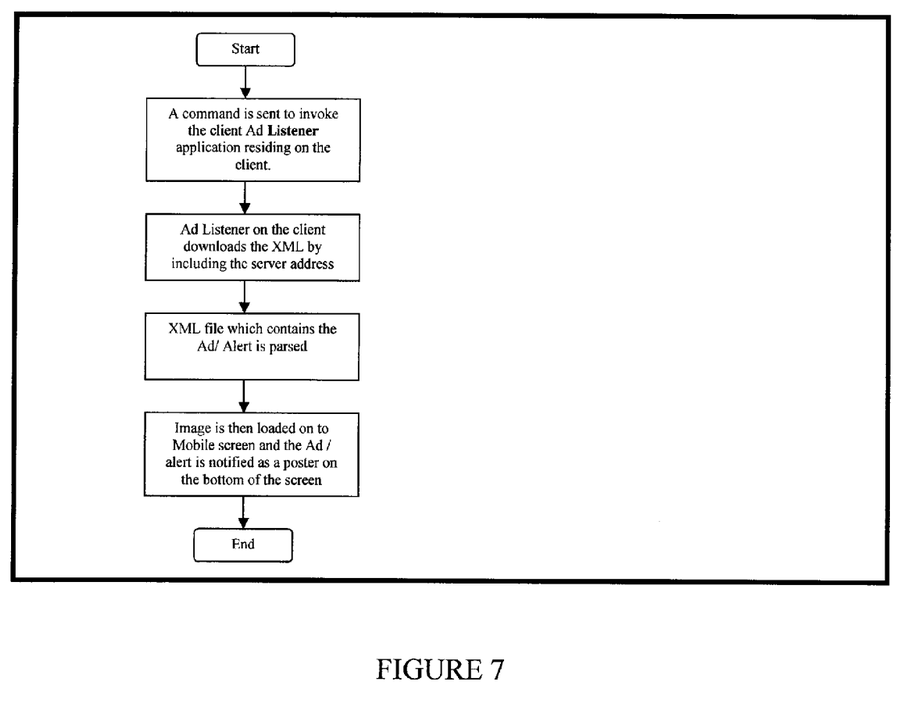
FIG. 7 is a flow chart for ad management/alert notification of the instant invention and FIG. 8 is the call flow for successful Alert Notification session.
Figure 8:
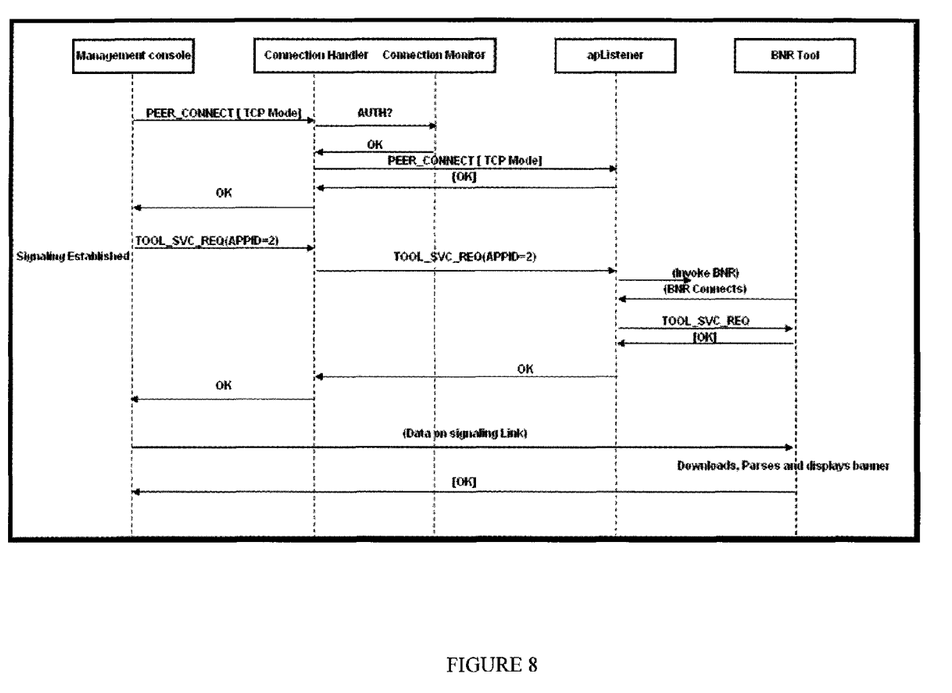

XML Format of the Ad/Alert/Banner Retrieved by the Client from Server (Refer FIG. 7)

```
<xml>
    <ad>
        <id>Advertisement/Banner/Alert ID</id>
        <header>
            <adName>Name of the Advertisement/Banner/Alert
            </adName>
            <adTitle>Title of the Ad </adTitle>
            <adText>Customized Text on the Ad/Alert</adText>
        </header>
        <content>
            <fontColorRGB>Color</fontColorRGB>
            <fontSize>Size</fontSize>
            <fontEffects>Effects </fontEffects>
            <bgColor>Background color</bgColor>
            <adEffects>Effects</adEffects>
            <picWidth>Width</picWidth>
            <picHeight>Height</picHeight>
            <navigateURL> URL to navigate when the user clicks the Ad/Alert </navigateURL>
            <senderInfo />
            <displayTimeout />
            <trackBackLink />
        </content>
    </ad>
</xml>
```

Benefits of Ad Management/Alert Notification:

Following are the feature benefits:

The user can get Alerts, Ads or banners on the mobile device without the need for browsing through the internet.

Schedule Ad/Alert/banner to group or individual user at a particular time based on the type of content to be sent Every Ad/Alert/Banner can be customized according to the device type used as every device screen has different screen size All Alerts/Ads/Banners have provisions to disappear automatically after displaying for few seconds or the user can close the same. Configuration options would be available on the server side.

Content type for the Ad/Banner/Alert can be of the following:

Plain Text

Hyperlink

Any Local application on the device

User will be provided with an option of opting out of Ad Manager/Alert Notification feature.

When the user clicks on the Ad/Banner/Alert, it launches the hyperlink associated with it or launches any application like media player, any static file etc.

Push Ads, Banner, Alerts on any device type.

Irrespective of what screen the user is in the Ad/Banner/Alert will be displayed on the Mobile screen.

A Virtual Mobile Management Process that can control any Mobile device by sending the required commands over an TCP/HTTP/HTTPS Connection. The client application on the device captures the snapshot of the device, compresses and encrypts the data and posts on the server. On the server, the xml file is then parsed, decrypted and decompressed and the corresponding values are stored in the database. The Console application on the server loads the most recent image from the database for every refresh for the complete session. The virtual view of the device starts only after the client explicitly authorizes the request from the server. When the user clicks on the Virtual View of the device on the Server webpage (Image posted by the device and retrieved via database) the image get displayed on the webpage. Also the virtual key presses and taps can be simulated from the server webpage. Ad management/alert notification allows a user to create new Advertisements/Banners/Alerts. Advertisements are managed by adding an image to the background of the Ad; Changing the Text on the Ad; Create Special effects for the Text on the Ad; Customizing Font color and size. After the Advertisements/Alerts/Banners are created on the server, the same can be pushed on to the mobile device. A command is sent to invoke the client Ad Listener application residing on the client. The client application uses the above message in the command as argument & includes the fully qualified server address & downloads the XML, parses it, applies the settings & displays the Advertisement. The Advertisement can be sent to the mobile devices instantaneously or scheduled for delivery at a later time. The user can get Alerts, Ads or banners on the mobile device without the need for browsing through the internet or explicitly requesting for the same.

What is claimed is:

1. A system for controlling, managing and delivering notifications to mobile devices comprising:
at least one mobile client device including means for communicating with at least one server, said server having at least one application tool capable of virtual mobile management;
said at least one server including means for establishing communications between said at least one mobile client device and said at least one server, said means for establishing communications having a protocol stack that sends Ad Alerts and performs Virtual Mobile Management for remotely viewing said at least one mobile client device;
said protocol stack comprises a first layer that establishes connection with said application tool, a second layer that establishes a session from a received connection request, a third layer that sends at least one bearer message between two communicating peers and sends at least one signaling message between two communicating peers;
wherein said system simultaneously receives said Ad Alert using said protocol stack on said at least one mobile client device and permits remote viewing and control of said at least one mobile client device by a technician;
said at least one server including means to authenticate incoming connections from said at least one mobile client device; and
means to initiate a communication session between said at least one server and said at least one mobile client device, said at least one server including means to balance multiple communication sessions between multiple said servers and multiple said client devices.

2. The system of claim 1 wherein said at least one server includes means to permit access of said at least one server and at least one mobile client device by an individual whereby instructions can be delivered to said at least one server and said at least one mobile client device.

3. The system of claim 2 wherein said protocol stack interacts with a console, said console in communication with said at least one server, said console including a graphical user interface, said graphical user interface providing information related to said at least one mobile client device, informational messages to be delivered to said at least one mobile client device, said informational messages including information regarding virtual mobile management sessions, alert notifications or activity logs of said at least one mobile client device.

4. The system of claim 3 wherein said protocol stack provides a means to establish communications between said at least one mobile client device, said at least one server and said console that further includes a communication means to establish peer-to-peer communications between at least two mobile client devices.

5. The system of claim 4 wherein said communication means to establish peer-to-peer communications between said at least two mobile client devices include a first link which permits only bearer communications to be established between said at least two mobile client devices and a second link which permits only signaling communications to be established between said at least two mobile client devices.

6. The system of claim 4 wherein said means to establish communications with at least one mobile client device and at least one server includes means permitting an authorized individual to remotely display information, resize an image, refresh an image, optimize a bandwidth, remotely control key inputs, control multiple sessions between multiple said mobile client devices.

7. The system of claim 6 including a client application on said at least one server, said client application including means to capture a snapshot of values of said at least one mobile client device, said client application capable of encryption, said client application converts said values to xml format, said client application transmits said values using a delta compression algorithm, and means to display said snapshot on said console, whereby said system may simultaneously receive said Ad Alert using said protocol stack on said at least one mobile client device and permit remote viewing and control of said at least one mobile client device by a technician.

8. The system of claim 7 including means to send said snapshot to a webpage and means to display said snapshot on said webpage, wherein said at least one mobile client device can be authorized and registered to said system for receiving said Ad Alert and for permitting said remote viewing and control.

9. A method of unhindered remote connectivity for controlling, managing and delivering notifications to mobile devices comprising:
   establishing communications between at least one mobile client device at least one server and a console, authenticating incoming connections from said at least one mobile client device;
   communicating between said at least one mobile client device, said at least one server and said console, registering and authorizing said at least one mobile client device to permit simultaneously receiving at least one Ad Alert and to remotely view and control said at least one mobile client device by a technician; and
   balancing multiple communication sessions between multiple said servers and multiple said client devices;
   compressing device capture values using at least one delta compression algorithm;
   sending said compressed values by utilizing a protocol stack, said protocol stack comprises a first layer that establishes connection with said at least one tool, a second layer that establishes a session from a received connection request, a third layer that sends at least one bearer message between two communicating peers and said third layer sends at least one signaling message between two communicating peers;
   displaying at least one mobile device from said console, capable of seamlessly displaying multiple device screens from said console; and
   simultaneously sending said at least one Ad Alert and to remotely view and control said at least one mobile client device by a technician.

10. The method of claim 9 including permitting access of said at least one server and at least one mobile client device by an individual whereby instructions are delivered to said at least one server and said at least one mobile client device.

11. The method of claim 10 including communicating with at least one server, a graphical user interface, said graphical user interface providing information related to said at least one mobile client device, delivering informational messages to said at least one mobile client device, said information messages including information regarding virtual mobile management sessions, alert notifications or activity logs of said at least one mobile client device.

12. The method of claim 11 establishing communications with at least one mobile client device and at least one application and establishing at least one session involving said at least one mobile client device and said console establishing peer-to-peer communications with at least two mobile client devices.

13. The method of claim 12 wherein establishing communications between said at least two mobile client devices include a first link which permits only bearer communications to be established between said at least two mobile client devices and a second link which permits only signaling communications to be established between said at least two mobile client devices.

14. The method of claim 12 establishing communications with at least one client mobile device and at least one server and permitting an authorized individual to remotely display information, resize an image, refresh an image, optimize a bandwidth, remotely control key inputs, control multiple sessions between multiple said mobile client devices.

15. The method of claim 14 capturing a snapshot of values of said at least one mobile client device, encrypting said values, converting said snapshot to xml format, transmitting said values using delta compression algorithm and displaying said snapshot on said console.

16. The method of claim 15 including sending said snapshot to a webpage and displaying said snapshot on said webpage, wherein said at least one mobile client device can be authorized and registered to said system for receiving said Ad Alert and for permitting said remote viewing and control.

* * * * *